United States Patent [19]

Forkner

[11] 4,104,405

[45] Aug. 1, 1978

[54] FOOD PRODUCT HAVING EXPANDED CONFECTION AND METHOD OF MANUFACTURE

[76] Inventor: John H. Forkner, 2116 Mayfair Dr., West, Fresno, Calif. 93703

[21] Appl. No.: 857,091

[22] Filed: Dec. 5, 1977

Related U.S. Application Data

[63] Continuation-in-part of Ser. No. 798,255, May 8, 1977, abandoned, which is a continuation of Ser. No. 550,549, Feb. 28, 1975, abandoned, which is a continuation-in-part of Ser. No. 517,078, Oct. 23, 1974, abandoned.

[51] Int. Cl.² .................. A23G 3/00; A21D 13/00
[52] U.S. Cl. ..................... 426/94; 426/103; 426/104; 426/139; 426/660; 426/101
[58] Field of Search ............ 426/103, 138, 139, 247, 426/249, 282, 284, 445, 447, 448, 564, 660, 101, 143, 279, 280, 283, 391, 243, 94

[56] References Cited

U.S. PATENT DOCUMENTS

| | | | |
|---|---|---|---|
| 1,558,922 | 10/1925 | Reilly | 426/139 |
| 1,638,480 | 8/1927 | Feybusch | 426/94 X |
| 1,878,342 | 9/1932 | Stevenson | 426/139 |
| 2,248,448 | 7/1941 | Chester | 426/94 |
| 2,697,041 | 12/1954 | Graham | 426/139 |
| 2,877,117 | 3/1959 | Heyman | 426/139 |
| 2,998,318 | 8/1961 | Forkner | 426/275 |
| 3,020,164 | 2/1962 | Forkner | 426/103 X |
| 3,057,739 | 10/1962 | Forkner | 426/445 |
| 3,085,588 | 4/1963 | Collier | 426/134 X |
| 3,119,354 | 1/1964 | Gawlitza et al. | 426/243 |
| 3,366,485 | 1/1968 | Hopkins et al. | 426/564 X |
| 3,615,593 | 10/1971 | Patil | 426/564 X |
| 3,711,300 | 1/1973 | Forkner | 426/275 |
| 3,779,772 | 12/1973 | Forkner | 426/275 |
| 3,782,966 | 1/1974 | Forkner | 426/275 |

OTHER PUBLICATIONS

"An Encyclopedia of Candy and Ice Cream Making," S.I. Leon ed. Chem. Pub. Co. Inc., 1959, pp. 295–301.
Up to Date Confectionery, A. R. Daniel, 4th Ed., MacClaren & Sons Ltd., Eng., 1965, p. 447.

*Primary Examiner*—Jeanette M. Hunter
*Attorney, Agent, or Firm*—Flehr, Hohbach, Test, Albritton & Herbert

[57] ABSTRACT

A food product comprising an edible shell of cooked dough (e.g., an ice cream cup or cone) having expanded confection extending about and bonded to the head portion of the shell, the product being used like an ice cream cone (i.e., by depositing a frozen dessert on the head) and consumed by progressively eating the frozen dessert together with the expanded confection. Also a method for the manufacture of such products in which confection disposed about the head is heated, expanded and caused to be effectively bonded to the outer peripheral surface of the head.

21 Claims, 17 Drawing Figures

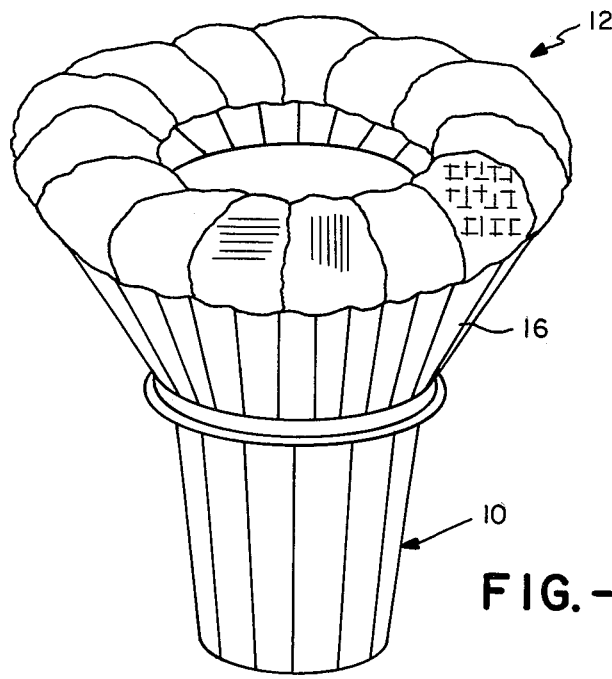

FIG.—1

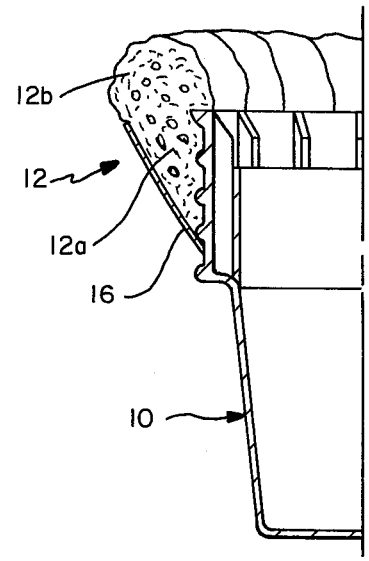

FIG.—2

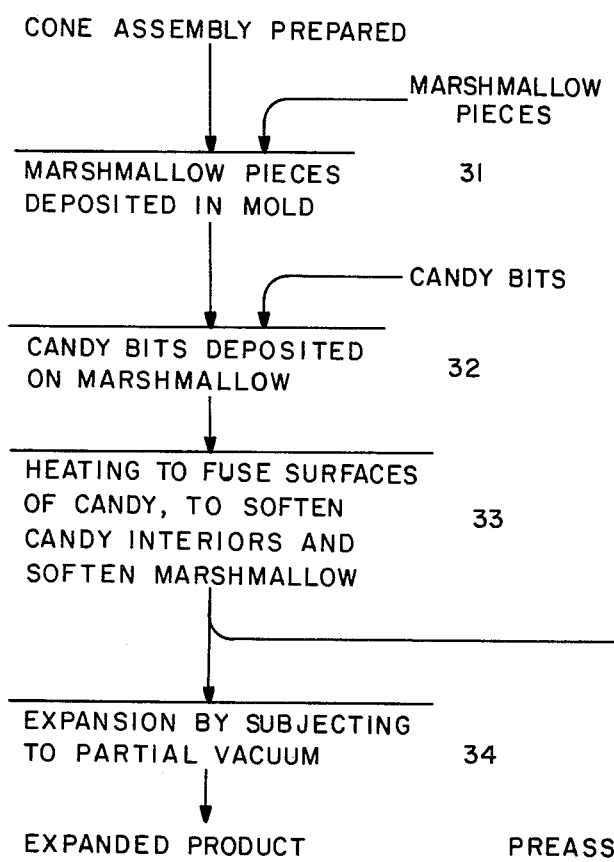

```
          CONE ASSEMBLY PREPARED
                    │
                    │        MARSHMALLOW
                    │           PIECES
                    ▼
          MARSHMALLOW PIECES      31
          DEPOSITED IN MOLD
                    │
                    │         CANDY BITS
                    ▼
          CANDY BITS DEPOSITED    32
          ON MARSHMALLOW
                    │
                    ▼
          HEATING TO FUSE SURFACES
          OF CANDY, TO SOFTEN
          CANDY INTERIORS AND     33
          SOFTEN MARSHMALLOW
                    │
                    ├──────────────────────┐
                    ▼                      │
          EXPANSION BY SUBJECTING           │
          TO PARTIAL VACUUM       34       │
                    │                      │
                    ▼                      ▼
          EXPANDED PRODUCT        PREASSEMBLED PRODUCT
```

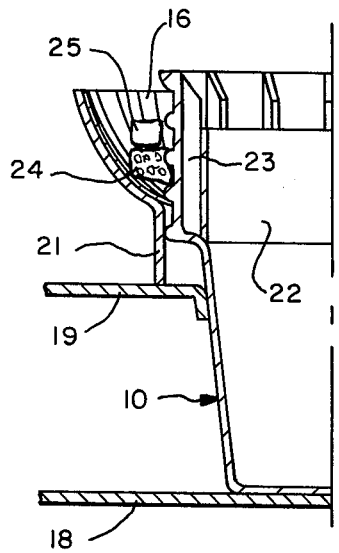

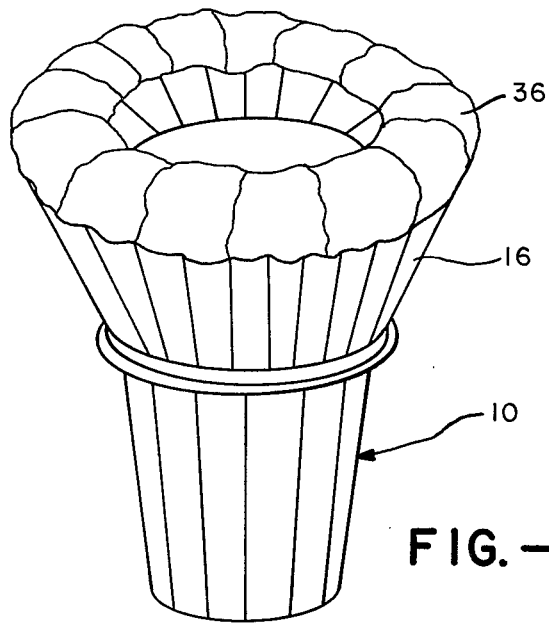
FIG.—5
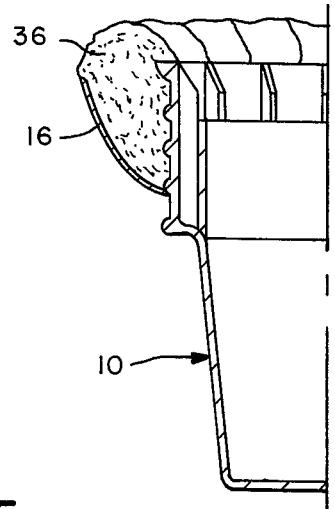
FIG.—6
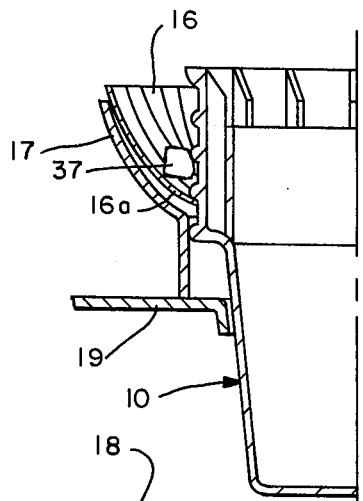
FIG.—7
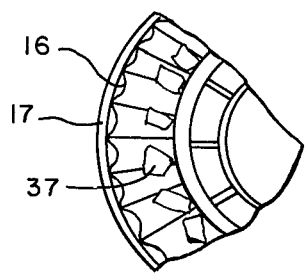
FIG.—8
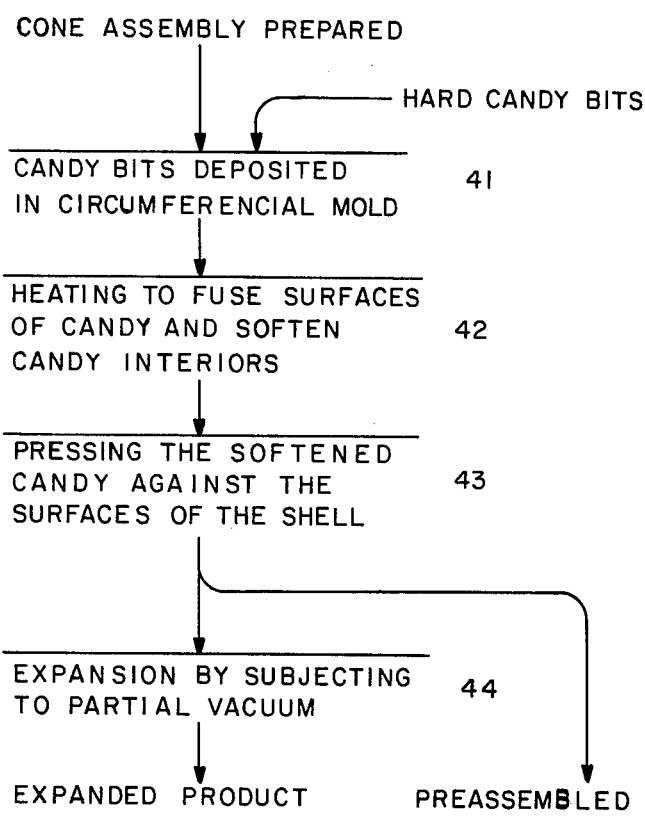
FIG.—9

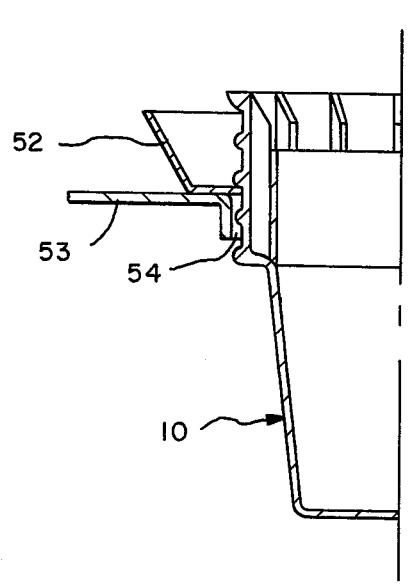
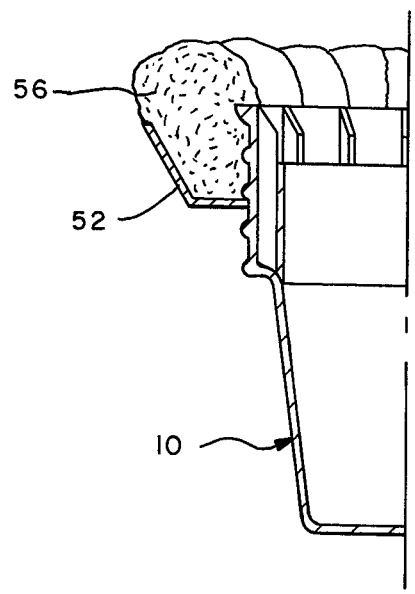
FIG.—10  FIG.—11
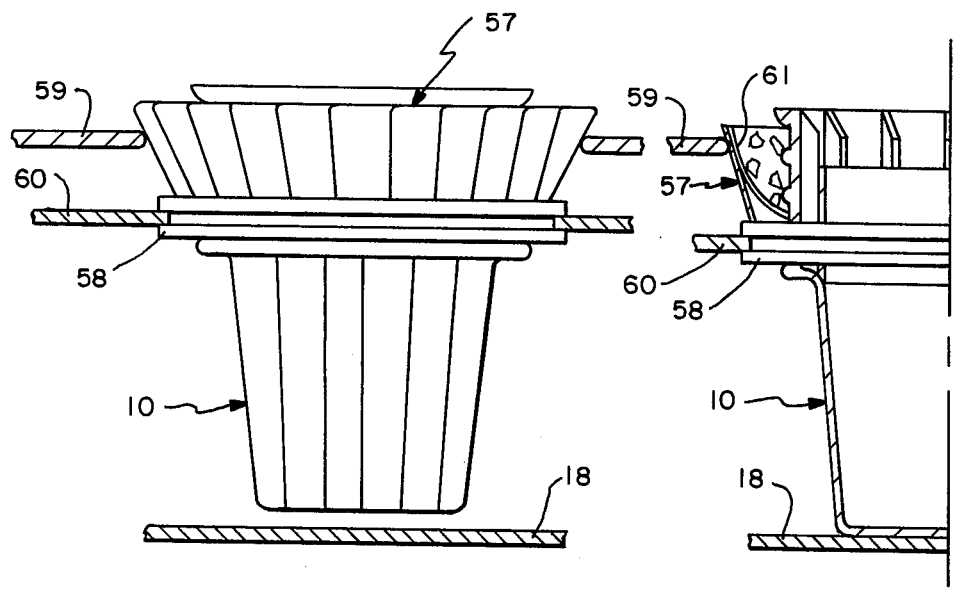
FIG.—12  FIG.—13

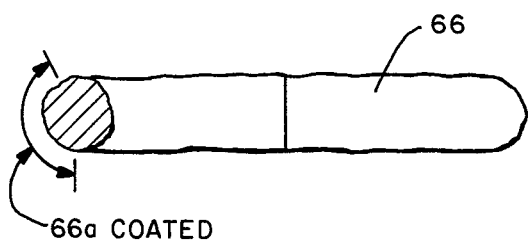
FIG.—14
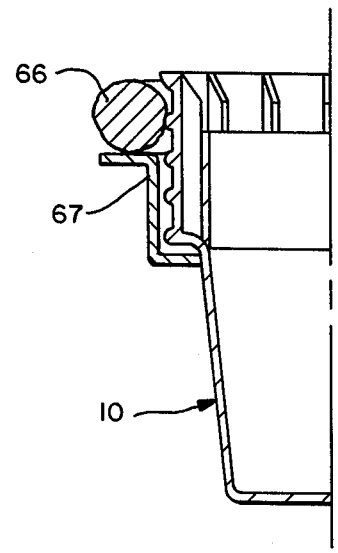
FIG.—15
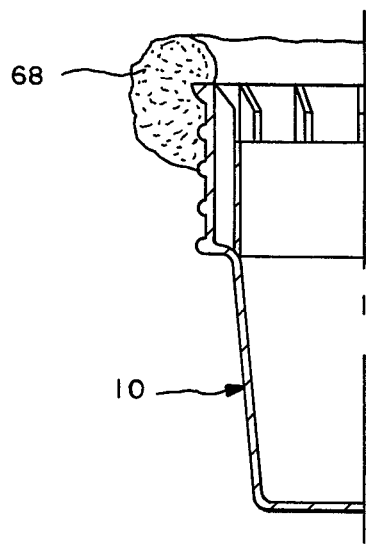
FIG.—16
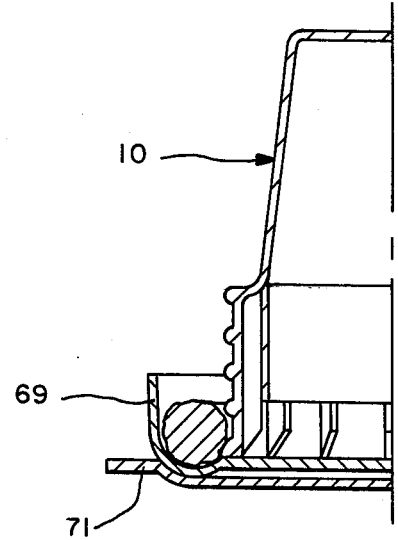
FIG.—17

FOOD PRODUCT HAVING EXPANDED CONFECTION AND METHOD OF MANUFACTURE

CROSS-REFERENCE TO RELATED APPLICATIONS

This invention is a continuation-in-part of copending application Ser. No. 798,255 filed May 18, 1977 now abandoned, which in turn is a continuation of application Ser. No. 550,549, filed Feb. 28, 1975 now abandoned, the latter being a continuation-in-part of application Ser. No. 517,078 filed Oct. 23, 1974 now abondoned. Also reference is made to copending application Ser. No. 669,025 filed Mar. 22, 1976 now U.S. Pat. No. 4,068,007, a continuation of Ser. No. 524,448 filed Nov. 18, 1974 (now abandoned), and copending Ser. No. 735,190 filed Nov. 18, 1974, a continuation of Ser. No. 517,078 filed Oct. 23, 1974 (now abandoned). Further reference is made to U.S. Pat. Nos. 3,711,300 granted Jan. 16, 1973, 3,779,772 granted Dec. 18, 1973, 3,782,966 granted Jan. 1, 1974, and 3,989,853 granted Nov. 2, 1976.

BACKGROUND OF THE INVENTION

This invention relates generally to edible food products having expanded confection and methods for their manufacture.

It is known that certain confections can be greatly expanded in volume by heating to soften the same, followed by applying a partial vacuum. Certain sugars present in most commercial confections impart expandable properties, such as the solids of corn syrup (containing dextrose, maltose and dextrins), refined corn sugar (dextrose), malt syrup, malt sugar, hydrolyzed cereal solids of low dextrin equivalency (e.g., DE 15-35), and confections like peanut brittle which include such sugars. The aforesaid U.S. patents disclose such expanded products and various methods for their manufacture. Copending application Ser. No. 735,190 filed Oct. 26, 1976 discloses a product having an expanded confection bonded to a shell which is intended to be consumed, like an ice cream cone. The confection in that instance has an expanded mass extending above the head of the shell and bonded to the inner shell surface. Such a product is not adapted to receive ice cream or other frozen dessert.

SUMMARY OF THE INVENTION AND OBJECTS

In general, it is an object of the present invention to provide a food product which includes an expandable confection and is consumed with an added frozen dessert.

Another object is to provide a food product which includes an edible shell having expanded confection extending about and bonded to the head portion of the shell in such a manner that it is consumed together with a frozen dessert or ice cream (e.g., so-called soft ice cream) deposited on the head.

Another object is to provide an expanded confection product having a relatively large volume for its weight and in which the lower or under portion that has been expanded to a greater degree is supported by an overlying expanded portion of greater shape.

Another object is to provide a desirable and attractive expanded confection product and a method of manufacture whereby the expanded confection displays various bright colors derived from the source confection.

Another object is to provide a novel method for making products incorporating the invention, the method being characterized by the use of a mold cavity surrounding the head of the shell which retains the confection before and during expansion.

Another object is to provide a method of manufacture which promotes effective bonding to the peripheral surfaces of the head portion of the shell.

Another object is to provide a method in which heating and expansion of the confection is carried out in a manner which not only shortens the processing time, but in addition contributes to dehydration and volume stability.

In general, the invention is a food product consisting of a shell comparable to an ice cream cone or cone which has expanded confection bonded to the peripheral surface of the head of the shell in such a manner that a scoop of ice cream or other frozen dessert may be applied upon the head and in the space generally surrounding the confection. The invention also includes a method or process for the manufacture of such products, the method involving a particular procedure which employs a mold cavity which retains the confection before and during heating and expansion.

Additional objects and features of the invention will appear from the following description in which the preferred embodiments have been set forth in detail in conjunction with the accompanying drawing.

BRIEF DESCRIPTION OF THE DRAWING

FIG. 1 is a perspective view illustrating one product incorporating the present invention;

FIG. 2 is a one-half section in elevation of the product shown in FIG. 1;

FIG. 3 is a one-half section in side elevation showing an assembly of parts preparatory to heating and expansion;

FIG. 4 is a flow diagram illustrating steps in the manufacture of the product shown in FIG. 1;

FIG. 5 is a perspective view like FIG. 1 but showing an embodiment in which only one type of source confection may be employed;

FIG. 6 is a half-section in side elevation showing the product of FIG. 5;

FIG. 7 is an assembly preparatory to heating and expanding the confection and indicating application of pressure to the candy after heating.

FIG. 8 is a plan view of a portion of the assembly shown in FIG. 7;

FIG. 9 is a flow diagram showing the steps carried out for the manufacture of the product shown in FIGS. 5 and 6;

FIG. 10 is a half-section in elevation illustrating another embodiment in which the mold space is formed of edible material;

FIG. 11 is a half section in elevation illustrating a product made by using the assembly of FIG. 10;

FIG. 12 is a side elevation partly in section showing an assembly having means to contract the mold space;

FIG. 13 is a half section in elevation showing use of the assembly of FIG. 12.

FIG. 14 is a half section in elevation showing a candy ring that can be used in the manner shown in FIG. 15;

FIG. 15 is an assembly incorporating the candy ring of FIG. 14;

FIG. 16 illustrates a product made by using the assembly of FIG. 15;

FIG. 17 is a detail in half section showing an assembly in which the shell is inverted.

DESCRIPTION OF THE PREFERRED EMBODIMENTS

The product shown in FIG. 1 consists of a shell 10 which in this instance is a conventional ice cream cone made of sweet dough or batter and which has sufficient strength for handling but is friable and edible. The upper annular portion of greatest diameter may be referred to as the head of the shell. Surrounding and extending upwardly from the head of the shell there is an expanded annular mass 12 of confection which is bonded to the outer peripheral surface of the shell. It will be seen that the interior of the head portion 11 is open for receiving a scoop of ice cream or other frozen dessert. A plurality of such products can be nested and packaged in nested form for storage and distribution.

The general structure of the expanded mass 12 can be better seen in FIG. 2. In the one embodiment shown, the lower portion 12a of the volume has relatively large pores or cells and is bonded to the outer surface of the shell. The upper volume 12b is integrally attached to the portion 12a and extends over the upper surfaces of portion 12a in the manner illustrated. The pores or cells of the volume 12b are relatively smaller than the major volume 12a, indicating that for a given weight the confection making up the volume or portion 12b has not been expanded to the extent of the volume or portion 12a. For reasons that will be presently explained, the portion 12b has greater strength than the portion 12a, due largely to the lesser degree of expansion, and also, as will be presently explained in greater detail, the surface of the portion 12b preferably exhibits bright colored areas which are derived from colored areas of the source confection. In other embodiments the confection may be of one kind and after expansion the pore size may be relatively uniform. Because the expanded confection mass 12 extends about and is bonded to the peripheral surface of the head of the shell, preferably protruding above the rim of the cone, it does not interfere with placement of a scoop of ice cream upon the head in the manner conventionally followed in dispensing ice cream cones. Likewise, when the ice cream or other frozen dessert is applied, it contacts only a minor part of the expanded mass, thus limiting any tendency for moisture from the ice cream or other frozen dessert to be rapidly absorbed by the expanded mass. Such absorption tends to cause collapsing of the expanded confection. Assuming that the expanded mass 12 has the characteristics desired, which are obtained by methods presently disclosed, portions of the mass can be broken away as the frozen dessert is consumed without causing the remaining portions of the expanded mass to break or fall away from the shell. The breakaway may involve severance from the walls of the shell or may include removal of the adjacent portion of the friable shell.

Assuming that two types of source confections are employed, one material has a relatively high moisture content, as for example from 10 to 20%. Also it contains in its formulation gel-forming and film-forming ingredients, such as gelatin, albumen, or natural gums, singly or in combination. In addition, it is desirable that this confection be aerated during its manufacture, as by a whipping operation in which air is beaten into the mix. A confection possessing all of these characteristics is commercial marshmallow, which in a typical instance has a moisture content of the order of 15 to 20% and about 1.5 to 2.25% of a gel-forming ingredient (e.g., gelatin). It also contains a relatively high percentage of corn solids (e.g., 40% or more) which imparts expandability. While the moisture content of commercial marshmallow may generally range from 15 to 20%, it may be processed to have a lower moisture content (e.g., 10%). Marshmallows or marshmallow drops are manufactured and sold in various sizes, including a size of the order of 1 inch in diameter and rounded or with rounded corners, and a size commonly referred to as miniature marshmallows, about ½ inch in diameter and similarly shaped.

The other source confection which I can use in combination with the first named confection is what is commonly known as hard candy. Hard candies have relatively low moisture contents ranging for example from 1 to 2%. They also have a substantial content of corn sugar solids (e.g., 40% or more) which impart expandable properties.

Because of their different formulations and moisture contents, equal weights of the two source confections referred to above, under comparable conditions of temperature, time and applied vacuum, will expand differently. The first high moisture content source confection will expand to a much greater volume than the hard candy. However, when the high moisture content source confection is expanded by itself without supplemental heating and over a short period (e.g., 1 to 20 minutes), it tends to collapse after the vacuum is broken, and the resulting product does not have the desired edible and friable prperties. According to my observations, this is due to a substantial residual moisture content which is such that the expanded marshmallow confection is not solidified as a stable greatly expanded friable mass at the end of the expanding operation and after cooling. I attribute this to the fact that in contrast with expansion of hard candy under comparable conditions, the sensible heat of the material is insufficient to enable dehydration to the point of volume stability under the partial vacuum. Hard candy having corn sugar solids can be readily expanded by heating followed by subjecting the material to a partial vacuum for a short period (e.g., 1 to 20 minutes), and when the vacuum is broken and the product cooled, the expanded material has a good friable cellular structure. However, the degree of expansion is far less than for the same weight of a confection like marshmallow. Cooling during such processing occurs by evaporation of moisture under the applied partial vacuum, with some final cooling to ambient temperature after the vacuum is broken.

The above procedure employs the source materials in a novel manner which provides a high volume for the weight of the confection used, while at the same time controlling the expansion and providing a stable and friable cellular structure at the high volume desired. Also during expansion the high moisture content confection has a boosting effect which elevates the other confection and causes the latter to form an upper expanded surfacing which preferably protrudes above the head of the cone.

The procedure described above can be carried out by use of an assembly as shown in FIG. 3. In this instance means is associated with the head portion of the shell which forms an annular mold space surrounding the head. In this instance the means consists of an annulus 16 which can be made of inexpensive material such as waxed paper, foil or foil laminate. The paper preferably is fluted or corrugated, because such paper can be more readily stripped from the expanded confection mass. In this instance the annulus 16 flares outwardly and upwardly, while the lower end fits snugly about the head of the cone. Immediately surrounding the paper annulus 16, there is an annular supporting member 17 which can be made of suitable material and which serves to support and maintain the paper annulus 16 in place. Preferably the member 17 is made of material of poor heat conductivity, such as a plastic material or cellular fiber blended with a plastic resin. In FIG. 3 it is assumed that the shell 10 together with other like shells, is retained within a rack which may include the bottom plate 18 which supports the shells, and the plate 19 having openings which accommodate the shells. The lower annular extension 21 of the member 17 is shown resting upon the plate 19. The type of cone or shell illustrated in FIG. 3 also is provided with an inner annular wall 22 which is connected to the outer wall of the head by the webs 23.

In some instances the member 16 may have sufficient strength to function as a mold member without the member 17. Also in some instances member 17 may be coated with a material (e.g., Teflon, hard fat or starch) to inhibit sticking of the final expanded material when member 16 is omitted.

The source confection is introduced into the mold space between the paper annulus 16 and the head of the shell. Assuming use of the two types of confection, the high moisture content confection pieces 24 are deposited in the lower end of the mold space, and thereafter hard candy pieces 25 are deposited on top of the first confection. Assuming that the first confection is commercial marshmallow, I prefer to use a commercial form of marshmallow that has been cured, and in addition, I prefer in this instance to have it in relatively small pieces. These pieces may range in size from about 1/16 to ⅛ inches and may be produced by subdividing larger pieces of cured marshmallow. The hard candy 25 is in the form of pieces such as are commonly known as candy bits or candy pillows. For example, such pieces may be about ½ inch long, ⅜ inch wide, and ⅜ inch thick at the center, although other sizes can be used.

The proportions by weight of the high moisture content confection and the hard candy can be varied in accordance with the type of final product desired. However, I prefer to utilize a quantity of the high moisture content confection by weight which is greatly less than the amount of hard candy used. By way of example, the amount by weight of hard candy used can be from 5 to 20 times the weight of the high moisture content confection. In a typical instance, one gram of the high moisture content confection can be used together with 9 grams of the hard candy. Both confections are distributed about the head of the shell, although the pieces may or may not be in direct contact with each other. Expansion results in areas of direct contact between the expanded hard or low moisture content candy pieces.

In addition to utilizing the pieces of hard candy as described above, it is preferable to utilize hard candy bits or pillows which have bands or areas of bright color on their surfaces. Typical colors are red, yellow, green and the natural white of the candy. Some pieces may be malted milk balls or fragments thereof which have not been expanded.

After introducing the confections into the mold space provided by the paper annulus 16, the assembly is in condition for proceeding with heating and expansion. While it is possible to heat in hot air as provided by a conventional hot air oven, the confections preferably are heated by exposing their upper surfaces to downwardly directed radiant heat. A cooking broiler provided with overhead radiant heating elements is suitable for this purpose. Heating is continued for a relatively short period of the order of from 1 to 5 minutes. During this time the directly exposed surfaces of the candy bits are rapidly heated to a temperature sufficiently high (e.g., 160° to 250° F.) to make them fluid or semi-fluid. Also the interiors of the candy pieces are heated sufficiently (e.g., 120° to 160° F.) to soften them to an extent sufficient for expansion. In addition, some heat penetrates the lower mass 24 of the high moisture content confection to elevate its temperature to an extent sufficient for controlled expansion (e.g., 100° to 120° F.). Thus this type of heating provides different temperature levels for different portions of the hard candy and different average temperatures for the hard candy which is directly exposed to radiant heat and the underlying marshmallows which are completely or partially shielded from direct exposure by the hard candy.

Following heating as described above, the assembly is immediately placed in a vacuum chamber, and by means of a suitable vacuum pump the pressure within the chamber is progressively reduced to an end partial vacuum corresponding to 29 inches mercury column. By the time the vacuum reaches a value of about 15 inches mercury column, initial expansion of the first confection 24 occurs without, however, any appreciable expansion of the hard candy. Initial expansion of the high moisture content confection tends to push or boost the hard candy upwardly, with the hard candy pieces being more or less adhesively secured to the high moisture content confection due to fusion of their outer surfaces. As the vacuum increases, the high moisture content confection continues to expand, and at the same time the hard candy expands over the upper surface of the expanded high moisture content confection. During the expansion just described, a substantial amount of heat transfer occurs from the hard candy pieces, which are at a higher average temperature and represent a greater weight, to the underlying high moisture confection, which is at a lower average temparature and of lesser weight, assuming that differential heating is employed as previously described. This heat transfer plays a part in the removal of moisture from the high moisture content confection, or in other words, in deyhdrating the expanded marshmallow type of confection to a point where at the end of the expansion operation this entire expanded mass has sufficient strength and stability to inhibit collapsing when the vacuum is broken. Also the overall low moisture content attained (e.g., average 1 to 1.5%) promotes production of a final expanded mass which is friable, crunchy and edible as desired.

During the expansion of the confections as described above, some of the fused or molten surfaces of the hard candy is spread over the upper surface of the mass. This filming over effect serves to transfer some of the molten material to the marshmallow, and when the hard candy has color areas, color areas are thereby spread or diffused over the upper surfaces of the entire mass.

The final expanded confection mass is strengthened by the expansion of the hard candy over the upper surface of the mass by partial bonding between the expanded hard candy masses and by the filming over effect described above. The expanded hard candy has greater strength than the expanded marshmallow and with the above mentioned film forms in effect an arched expanded crust having its under side bonded to the weaker expanded marshmallow. The strengthening and supporting action occurs during as well as after expansion and aids in preventing collapse during the final expansion phases and cooling, and provides sufficient strength and stability for packing and distribution. Although the expanded hard candy in the final product provides strength as described above, some of the marshmallow tends to expand between the expanded masses of hard candy, thus providing bands that are weaker than direct bonds between the expanded hard candy. This promotes the ability of the total expanded mass to have portions broken away (as in eating) without breaking away other portions of the mass.

As explained above, assuming that the hard candy pieces have colored bands or areas, the colors are extended over the upper faces of the expanded mass, whereby the completed mass has a polychrome or rainbow-like appearance consisting of the colors derived from the original candy pieces which appear in flowing areas over the surface of the mass.

The steps of the process described above are shown in FIG. 4. In step 31 the marshmallow pieces are deposited in an annular mold space provided by the assembly of FIG. 3. In step 32 the hard candy bits are deposited upon the marshmallow pieces. In step 33 rapid differential heating of the confections occurs by exposing them to radiant heat. The heating serves to fuse surfaces of the hard candy, to soften the interior of the hard candy pieces, and to heat and soften the marshmallow. In step 34 the assembly and the confections are expanded by subjecting the entire assembly to a partial vacuum and cooling. After breaking the vacuum and cooling, the desired expanded product is in condition for marketing.

In some instances it may be desirable to provide an assembly similar to that shown in FIG. 3 having the confection in unexpanded form but suitable for shipment or marketing. Such an assembly can be subjected to heating and partial vacuum to expand the confections shortly before the product is sold to the consuming public. With controlled heating alone, some fusion of surfaces of the hard candy pieces and the softening of the high moisture content pieces is sufficient to cause bonding together of the pieces and attachment of the pieces to the outer surfaces of the shell head, whereby a pre-assembly is formed which can be shipped and handled without loss of the confection. In this instance the assembly as it is packaged may include only the paper annulus 16 together with the confections and the shell 10. Such assemblies may be nested and retained within a suitable carrier and enclosed within a wrapper sufficient to prevent deterioration of the confections. Before being sold to the consumer, the assembly is reheated and expanded.

During expansion of the confections, there is some light bonding of the confection expanded mass with the corrugated paper annulus 16. Either at the time the product is sold to the consumer, or after such sale, it is a simple matter to strip off the paper 16 without mutilating the expanded mass. The ease with which the paper can be stripped away is facilitated by utilizing corrugated paper as previously described. Also the use of material of poor conductivity for member 17, in contrast with metal, tends to substantially reduce adhesion of paper 16 to the expanded confection.

When foil is used in place of paper, a glossy surface is imparted to the expanded confection and provides an attractive appearance when the foil is removed. The same glossy surface is produced by use of foil-paper laminate, when the foil is next to the confection. Also when member 17 is used alone and has an inner smooth surface, the same surface effect can be obtained. While it is desirable to employ the high moisture content confection in the form of small pieces, it is possible to employ it in the form of slices or strings or tubular extrusions which are positioned at the bottom of the mold space.

Some non-expandable pieces of edible material, such as chopped nuts, may be added to the mold space together with the hard candy and marshmallow pieces before heating and expansion, in which event they are enveloped and distributed in the expanded mass. Also the hard candy pieces may incorporate such additives.

In general, for the type of products described above making use of high and low moisture content confections, good results are secured by using 22 to 24 grams of low moisture content candy with from 1 to 1.5 grams of marshmallow or like high moisture content confection.

FIGS. 5–9 illustrate another embodiment of the product which is somewhat similar in appearance to the product previously described but which has an expanded confection mass which is made of only one kind of confection. The product as shown in FIG. 5 is generally similar to the product of FIG. 1, except that the expanded mass 36, relative to its weight, is substantially smaller in overall volume. This product can be made by utilizing the assembly shown in FIG. 7. This assembly is similar to FIG. 3 but differs in that the annulus 16a (e.g., corrugated paper) has its lower portions spaced from the corresponding inner portions of member 17. Also the bottom of the shell is not seated on member 18. This assembly is charged with confection pieces 37 which are simply hard candy, such as the same candy bits used in connection with FIGS. 1–4. These pieces are distributed in the mold cavity and about the head as by shaking or vibrating. While radiant heating can be used, the assembly may be heated by hot air, as for example, by placing it in a conventional hot air oven. The oven temperature and time are such that surfaces of the hard candy are fused and the interiors of the candy pieces are softened. Immediately after heating and softening the candy pieces, the shell is pressed downwardly, as for example, to cause the shell to seat upon member 18. This serves to press the soft pieces of candy against the surfaces of the shell and against each other whereby their area of contact with the shell is greatly increased and an initial bond to the shell is established. During subsequent expansion in a partial vacuum the areas of contact and bonding to the shell are further increased. After expansion the expanded mass 36 may appear as shown in FIG. 6. When compared to the mass shown in FIG. 2, the mass 36 is substantially smaller in volume. Likewise the pores or cells of the expanded mass are substantially smaller than the major volume 12 of the expanded mass shown in FIG. 2 for a comparable weight of material. The exposed upper surfaces of the expanded mass 36 exhibit the rainbow or polychrome effects previously described, assuming that the candy bits employed have colored areas and that surfaces of the candy are fused and liquefied during heating.

FIG. 9 is a flow diagram illustrating the steps for manufacturing the product of FIGS. 5–8. In step 41 the candy bits are deposited in the circumferential mold space. In step 42 the assembly is subjected to radiant heat directed down upon the candy bits, and heating is continued to cause melting or fusing of the surfaces of the candy pieces and softening of their interiors. In step 43 the shell is pressed downwardly to press the softened candy pieces against the shell. In step 44 the assembly is subjected to a partial vacuum which may be increased to a final value equivalent to 27 to 29 inches mercury column to expand the confection to the desired degree. As in FIG. 4 the product after steps 42 and 43 can be packaged and shipped as a pre-assembly, whereby shortly before the product is sold, it is subjected to reheating and a partial vacuum to effect expansion.

In the embodiments described above, the mold space is formed by the number 16 or 16a and is supported by the member 17. Instead of utilizing mold-forming members that are removed after the assembly has been expanded, it is possible to use a member which remains a part of the final food product. Thus in FIGS. 10 and 11 a mold-forming annulus 52 is provided which has an inner diameter slightly greater than the diameter of the head portion of the cone. This member is made of edible material, as for example, the same material from which the cone 10 is made. In preparing an assembly preparatory to expansion, the annulus 52 is first placed upon the supporting shelf 53 of the rack in alignment with the opening 54, and then the cone is positioned as shown in FIG. 10. The confection or confections are then deposited within the annulus 52, and the assembly is subjected to heating and a partial vacuum in the same manner as in FIGS. 1–5. During expansion the confection becomes bonded to the adjacent surface of the cone. While the annulus 52 may not be sealed with respect to the head of the cone, the small clearance between these parts is insufficient for any substantial amount of expanding confection to extrude between the same. The final expanded confection mass 56 has characteristics similar to the expanded mass produced in accordance with FIGS. 1–4 or FIGS. 5–9, depending upon the confection used.

The embodiment of FIGS. 12 and 13 provides a different means and method of pressing the softened candy pieces against the head of the shell. In place of the annulus 17 there is an assembly 57 formed of overlapping leaves of thin spring metal attached to the mounting ring 58. The assembly seats within a stationary cam ring 59, and the mounting ring 58 can be raised or lowered by the engaging members 60. A liner 61 (FIG. 13) is positioned within assembly 58. After candy pieces are deposited in the mold cavity formed by the liner, heat is applied to soften the candy, and the ring 58 and cone are lowered to constrict the mold space and to press the softened candy pieces against the shell. Thereafter the confection is expanded. With this embodiment the liner may be paper, foil, foil-paper laminate, or a pliable edible material. Edible material may be an uncooked or partially cooked dough, separately prepared and inserted into assembly 57, or prepared by spraying a dough mix on the inner surfaces of the assembly, thus forming a pliable dough lining in situ. Such a lining can be partially cooked while retaining pliability before the shell is inserted and candy applied. After expansion the assembly 57 is enlarged by raising ring 58 or lowering the cam 59 whereby the leaves spring outwardly to release the expanded confection.

The embodiment of FIGS. 14–16 makes use of a candy ring 66 which is dimensioned to surround the head of the shell. For the purpose of controlling expansion the outer peripheral surface of the ring is coated as indicated at 66a with a material that restrains expansion, such as a hard edible wax. This ring can be assembled with a shell as shown in FIG. 15, with the ring resting on the ledge 67. After heating to soften the ring, expansion serves to provide a mass 68 somewhat as shown in FIG. 16. Note that the ring has expanded upwardly and inwardly against the periphery of the shell, to which it becomes bonded.

In the embodiment of FIG. 17 the shell is inverted upon the mold 69, which is supported on member 71. The confection employed may be candy pieces placed in the mold, or an uncoated candy ring as shown in FIG. 14.

Examples of my invention are as follows:

EXAMPLE 1

The high moisture content source confection was a commercial grade of miniature size marshmallows, each weighing $\frac{3}{4}$ gram and measuring about $\frac{1}{2}$ inch in diameter and $\frac{1}{2}$ inch long. To a quantity of these marshmallows there was added dry starch in the amount of one-fourth the weight of the marshmallows. This material was then fed to an attrition mill provided with rotary slicing blades rotating at relatively high speed. This served to subdivide the marshmallows into pieces of such size that they passed through a No. 3 mesh screen but remained on a No. 8 screen (U.S. Standard). The marshmallow pieces were then removed from the starch by screening. An assembly was then prepared as shown in FIG. 3. The annular member 16 was made of fluted paper. This provided an annular mold space having an inner diameter of about $2\frac{1}{8}$ inches, an upper radial dimension of about $\frac{3}{4}$ inch, and having a depth of about $1\frac{1}{4}$ inches. The annular member 17 was made of plastic material and serves as a backing for the paper 16. One and one-half gram of the small marshmallow pieces (about 50 pieces) was then distributed around the bottom of the mold space. The second source confection used was hard candy bits, and were pillow-shaped pieces each about $\frac{1}{2}$ inch long, $\frac{3}{8}$ inch wide and $\frac{3}{8}$ inch thick at the center. Twenty grams of the hard candy pieces were distributed about the mold space on top of the marshmallow pieces. The hard candy pieces had multi-colored areas in bands extending about the pieces.

Assemblies prepared as described above were placed in a rack and then introduced into a broiler-type oven having overhead heating elements. They remained in the broiler for about $1\frac{1}{2}$ minutes. Radiant heat from the elements was directed downwardly upon the exposed surfaces of the hard candy, and some exposed surfaces of the underlying marshmallow pieces. During this heating period, surfaces of the hard candy were heated to temperatures of the order of 180° to 220° F. whereby the surfaces of the candy pieces were fused or melted, and the interiors of the hard candy pieces were heated to a temperature of the order of 120° to 240° F. Thus when subjected to the partial vacuum there was a substantial increasing temperature gradient between the interiors of the pieces and their outer surfaces. Although surface areas of the hard candy pieces became molten, the pieces retained their essential physical identity. The underlying pieces of marshmallow were also heated, but not to temperatures as high as the hard candy pieces. In general, the marshmallow pieces were heated to a temperature level of the order of from 100° to 120° F.

After heating in the manner described above, the assemblies were placed in a vacuum vessel and a partial vacuum progressively applied, with the degree of vacuum gradually increasing in the first 30 seconds. It was noted that when the partial vacuum reached the equivalent of 10 inches mercury column, substantial expansion of the marshmallow pieces commenced. The marshmallow pieces reached a large part of their final volume when the partial vacuum reached 25 inches mercury column. As the mass of marshmallow pieces expanded upwardly, the hard candy bits were thrust upwardly and outwardly beyond the rim of the cone, and as the partial vacuum reached levels of the order of 25 to 29 inches mercury column, the hard candy pieces expanded over the surface of the expanded marshmallow. Expansion of the hard candy pieces caused a spreading of the candy color bands, thus causing the color of these bands to be distributed over the upper surfaces of the total expanded volume. After reaching a partial vacuum corresponding to 29 inches mercury column, application of the partial vacuum was continued over a period of about 3 minutes, and thereafter the vacuum was gradually released over a holding period of about ½ to 4 minutes. Upon release of the vacuum and after cooling, it was found that the confection had retained substantially all of the expansion occurring while being subjected to the partial vacuum, and that the expanded mass was stable and friable and at a relatively low moisture content of the order of 1%. Also it was found that the expanded mass was bonded to the outer surface of the head of the cone and that it had expanded for a substantial distance outwardly and above the upper rim or edge of the cone and was bonded to the cone. The surface configuration of the expanded mass was somewhat as illustrated in FIG. 1. There was considerable surface irregularity which was attributed to the positioning of the hard candy pieces about the periphery of the cone. Also colored areas of the candy pieces had been distributed over the surface of the expanded mass, thus providing a multicolored rainbow-like effect.

After cooling by exposure to the atmosphere, which required about five minutes at ambient temperature after release of the vacuum, the cones were removed from the supporting rack and the members 17, and it was found that the paper members 16 could be readily stripped away from the expanded confection mass without causing any disruption or breaking of the expanded confection. It was verified that ice cream of the soft type or frozen desserts could be deposited upon top of the cone within the space surrounded by the expanded confection and that portions of the expanded confection could be eaten together with the frozen dessert, without causing other portions of the confection to break or fall away from the cone. The expanded marshmallow was seen to have expanded between portions of the expanded hard candy and thereby contributing to the feature just mentioned.

EXAMPLE 2

An assembly was prepared as shown in FIG. 3 and in accordance with Example 1. The source material was hard candy of the character specified in Example 1. Pieces of the same size and color characteristics as specified in Example 1 were distributed about the bottom of the mold space. Ten grams of hard candy were supplied in this fashion. Such assemblies were placed in a suitable rack and then introduced into a broiler type oven provided with overhead radiant heating elements as described in Example 1. On different occasions the assemblies were subjected to such heating for periods ranging from 1 minute to 2 minutes. It was found that if they were subjected for too long a time to the radiant heat the pieces would tend to liquefy and lose their individual identity. In general, best results were obtained by continuing such heating to the point where exposed surfaces of the pieces were fused and with heating of the interiors of the pieces to soften the same, but without causing the pieces to lose their physical identity.

Assemblies as described above, after being heated for about 1½ minutes were subjected to a partial vacuum in the manner described in Example 1. The total time period in the partial vacuum was 5 minutes. Thereafter the chamber was reduced to atmospheric pressure over a period of about 1 minute.

After cooling, the paper 16 was stripped away from the expanded confection, and it was observed that the expanded mass had good friability and eating properties. Also it was found that the colored areas of the hard candy pieces had resulted in related and different colored areas over the surfaces of the expanded mass. Expanded candy bits were bonded to each other in areas where they came into contact, and to the shell of the cone.

The above procedure was repeated but making use of pieces of another type of confection, namely, peanut brittle and unexpanded malted milk balls. Likewise in some instances non-expandable additives were used together with the confection pieces, as for example, chopped peanuts. After expansion, such non-expandable pieces were found distributed throughout the expanded mass.

EXAMPLE 3

The source confection was marshmallow and hard candy, the same as described in Example 1. However, miniature marshmallows were used without being subdivided, each measuring 1 inch in diameter and ½ inch thick. About 6 of such marshmallows were used for each cone, weighing in all 3.5 grams. The marshmallows were introduced into the lower part of an ice cream cone similar to that shown in FIG. 1. 13.5 grams of the hard candy, in pieces of the size used in Example 1, were then deposited on top of the marshmallows. This assembly was then subjected to radiant heating in the same manner as in Example 1, with heating being continued for a period of 1.5 minutes. The directly applied radiant heat served to heat the hard candy pieces without destroying their physical identity, the surfaces being melted and inner portions of the pieces being softened. The mass of marshmallows was also heated to a temperature of the order of 100° to 120° F. This assembly was then introduced into the chamber and partial vacuum applied. A partial vacuum of about 20 inches mercury column was obtained in about 15 seconds, and reached about 28 inches mercury column in about 25 seconds. Expansion was completed when the partial vacuum reached 29 inches mercury column. The vacuum at this level was continued for about three minutes, after which the vacuum was broken and the product permitted to cool by exposure to the atmosphere.

The product produced by the above Example 3 was similar to that illustrated in FIGS. 10–12. The great increase in volume of the marshmallows caused the hard candies to be thrust upwardly and to remain on the upper surface of the mass, and the expansion of the hard candy served to form a crust or expanded upper layer forming the upper part of the total volume and serving to strengthen the combined mass and prevent collapsing. Here again the colored areas derived from the hard candy pieces caused colored areas on the surfaces of the expanded mass in the same manner as in Example 1. It was found that this type of product could be crushed in the manner shown in FIG. 12 to receive a scoop of frozen dessert. Such crushability was attributed in part to the weaker structure of the expanded marshmallow in which the expanded hard candy was dropped.

What is claimed is:

1. A food product comprising a shell of cooked dough having an upper annular head portion adapted to receive a mass of frozen dessert and a lower hand hold portion, and an annular cellular mass of solid friable expanded confection carried by and surrounding only the head portion and bonded to the outer peripheral surface of the same, said expanded mass surrounding the region that is adapted to receive a mass of frozen dessert.

2. A product as in claim 1 in which the expanded mass is encased within retaining means that can be stripped from the expanded confection before eating.

3. A product as in claim 2 in which the retaining means is made of foil.

4. A product as in claim 2 in which the retaining means is made of corrugated paper.

5. A product as in claim 1 in which an edible cooked dough layer surrounds and is bonded to exterior surfaces of the expanded confection.

6. A product as in claim 1 in which the mass of expanded material extends about the head portion of the shell.

7. A product as in claim 1 in which a substantial volume of the confection is a minor part by weight of the total expanded mass and in which the remaining volume of the confection forms a denser and stronger expanded layer extending over the upper portion of the confection mass.

8. A product as in claim 7 in which said substantial volume of the confection is of the marshmallow type and the remaining volume is of the hard candy type.

9. A food product as in claim 1 in which a substantial volume of the expanded confection is an expanded confection of the marshmallow type, the remaining volume of the expanded confection being of the hard candy type, the latter being bonded to and disposed over exterior surfaces of the marshmallow type confection, the first-named volume being a minor part by weight of the total expanded mass.

10. A product as in claim 9 in which the hard candy type confection provides upper areas of different colors.

11. A method for the manufacture of a food product comprising providing an assembly including an edible shell of cooked dough having an open annular head portion and a hand-hold portion, the assembly also including means forming an annular mold space surrounding the head portion, depositing an expandable confection within the mold space and about the head portion, heating the confection to soften the same, and then subjecting the assembly to a partial vacuum to effect expansion and bonding of the expanded confection to the adjacent peripheral surfaces of the head portion, thereby forming an expanded confection that surrounds the head portion.

12. A method as in claim 11 in which the heat is applied to fuse surfaces of the confection and to soften the interiors.

13. A method as in claim 11 in which heat is applied by exposing surfaces of the confection to overhead radiant heating means to melt surface portions and to soften the interiors of the pieces.

14. A method as in claim 11 in which the mold space is formed by an annular member having an annular liner within the same, the liner being secured to the confection during expansion.

15. A method as in claim 11 in which the confection is of two kinds, the first one being of the hard candy type having a low moisture content and the second one having a higher moisture content, expansion of the confections forming a composite mass consisting of the expanded hard candy and the expanded second confection, the latter having a greater volume for its weight than the expanded hard candy.

16. A method as in claim 11 in which the confection is in the form of multicolored pieces of hard candy.

17. A method as in claim 15 in which the first confection is in the form of multicolored pieces, expansion of the confection serving to cause the expanded mass to have a multicolored surface.

18. A method as in claim 11 in which the expandable confection is in the form of a ring.

19. A method as in claim 11 in which the heated and softened confection, before expansion of the same, is pressed against the adjacent peripheral surface of the head portion to promote bonding of the expanded confection to said surface.

20. A method as in claim 19 in which the confection is pressed against the head portion by movement of the head portion toward the mold space.

21. A method as in claim 19 in which the confection is pressed against the head portion by reducing the radial dimensions of the mold space.

* * * * *